US011210548B2

(12) United States Patent
Futagami et al.

(10) Patent No.: US 11,210,548 B2
(45) Date of Patent: Dec. 28, 2021

(54) RAILROAD TRACK RECOGNITION DEVICE, PROGRAM, AND RAILROAD TRACK RECOGNITION METHOD

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Takuya Futagami, Kanagawa (JP); Yusuke Takahashi, Tokyo (JP); Hiroyuki Kobayashi, Ibaraki (JP); Yushi Kamo, Kanagawa (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 236 days.

(21) Appl. No.: 16/654,324

(22) Filed: Oct. 16, 2019

(65) Prior Publication Data

US 2020/0050882 A1 Feb. 13, 2020

Related U.S. Application Data

(63) Continuation of application No. PCT/JP2018/016313, filed on Apr. 20, 2018.

(30) Foreign Application Priority Data

Apr. 21, 2017 (JP) .............................. JP2017-084556

(51) Int. Cl.
*G06K 9/46* (2006.01)
*G06K 9/00* (2006.01)
*G06T 3/00* (2006.01)

(52) U.S. Cl.
CPC ....... *G06K 9/4638* (2013.01); *G06K 9/00791* (2013.01); *G06K 9/00798* (2013.01); *G06K 9/4609* (2013.01); *G06T 3/0012* (2013.01)

(58) Field of Classification Search
CPC ............. G06K 9/4638; G06K 9/00798; G06K 9/00791; G06K 9/4609; G06T 3/0012
See application file for complete search history.

(56) References Cited

U.S. PATENT DOCUMENTS

| 8,754,945 B2 | 6/2014 | Lee et al. |
| 2012/0086778 A1 | 4/2012 | Lee et al. |
| 2012/0086809 A1 | 4/2012 | Lee et al. |

FOREIGN PATENT DOCUMENTS

| CN | 106023076 A | 10/2016 |
| JP | 2000-32601 A | 1/2000 |

(Continued)

OTHER PUBLICATIONS

Maire, "Vision Based Anti-collision System for Rail Track Maintenance Vehicles" (published in IEEE Conference on Advanced Video and Signal Based Surveillance, pp. 170-175, Sep. 2007) (Year: 2007).*

(Continued)

*Primary Examiner* — Casey L Kretzer
(74) *Attorney, Agent, or Firm* — Oblon, McClelland, Maier & Neustadt, L.L.P.

(57) ABSTRACT

A railroad track recognition apparatus has an index calculating unit, an initial searching unit, a secondary searching unit, and a railroad track recognizing unit. The index calculating unit calculates an index value, for each pixel or pixel group of a captured image. The initial searching unit selects a line segment, having a larger evaluation value obtained from the index values, from a plurality of line segments in a first search area, and the secondary searching unit selects a line segment, having a larger evaluation value (Continued)

obtained from the index values, from a second area or a third area. The railroad track recognizing unit recognizes a railroad track based on reference points of the line segments selected by the initial and secondary searching units.

7 Claims, 11 Drawing Sheets

(56) References Cited

FOREIGN PATENT DOCUMENTS

| | | |
|---|---|---|
| JP | 2002-2485 A | 1/2002 |
| JP | 2002-8019 A | 1/2002 |
| JP | 2014-17611 A | 1/2014 |
| JP | 2014-62415 A | 4/2014 |
| JP | 2015-49740 A | 3/2015 |
| JP | 2016-91506 A | 5/2016 |
| JP | 2016-192109 A | 11/2016 |
| JP | 6034767 B2 | 11/2016 |
| TW | 201216711 A1 | 4/2012 |
| TW | I466545 B | 12/2014 |

OTHER PUBLICATIONS

Kaleli et al, "Vision-Based Railroad Track Extraction Using Dynamic Programming" (published in 12th International IEEE Conference on Intelligent Transportation Systems, pp. 42-47, Oct. 2009) (Year: 2009).*

Espino et al., "Rail Extraction technique using gradient information and a priori shape model" (published in 15th International IEEE Conference on Intelligent Transportation Systems, pp. 1132-1136, Sep. 2012) (Year: 2012).*

International Search Report dated Jul. 17, 2018 in International Application No. PCT/JP2018/016313.

Zhongli Wang et al., "An Inverse Projective Mapping-based Approach for Robust Rail Track Extraction", 8th International Congress on Image and Signal Processing (CISP 2015), 2015, pp. 888-893.

Jorge Corsino Espino et al., "Rail and Turnout Detection Using Gradient Information and Template Matching", IEEE, 2013, 6 pages.

* cited by examiner

| | LEFT END SIDE (LEFT TRACK) | RIGHT END SIDE (RIGHT TRACK) |
|---|---|---|
| START POINT OF LINE SEGMENT FIRST SELECTED | (x*, y*) | (x##, y*) |
| FIRST CHARACTERISTIC POINT | (x#, y*) | (x*, y##) |
| SECOND CHARACTERISTIC POINT | (x*, y#) | (x###, y###) |
| THIRD CHARACTERISTIC POINT | (x**, y*) | (x*#, y#*) |
| FOURTH CHARACTERISTIC POINT | (x*, y**) | (x**#, y*) |
| FIFTH CHARACTERISTIC POINT | (x*#, y*) | (x*, y#*#) |
| SIXTH CHARACTERISTIC POINT | (x*, y#) | (x##*, y*) |
| . . . | . . . | . . . |

*FIG. 10*

RAILROAD TRACK RECOGNITION DEVICE, PROGRAM, AND RAILROAD TRACK RECOGNITION METHOD

CROSS-REFERENCE TO RELATED APPLICATION(S)

This application is Continuation Application of PCT Application No. PCT/JP2018/016313, filed Apr. 20, 2018 and based upon and claiming the benefit of priority from Japanese Patent Application No. 2017-084556, filed Apr. 21, 2017, the entire contents of all of which are incorporated herein by reference.

FIELD

Embodiments described herein relate to a railroad track recognition device, a program, and a railroad track recognition method.

BACKGROUND

A device that detects a railroad track from an image with an object of inspecting a railroad track or detecting an obstacle existing within a railroad track is known. Such device, for example, detects a railroad track by matching a captured image and a template prepared in advance, or detects a railroad track along which a vehicle is travelling using an image captured by a stereo camera. However, there is a case in which a railroad track cannot be detected accurately using the existing device.

BRIEF DESCRIPTION OF THE DRAWINGS

FIG. 10 is a drawing showing details of point information 56.

DESCRIPTION OF EMBODIMENTS

Figure 1:
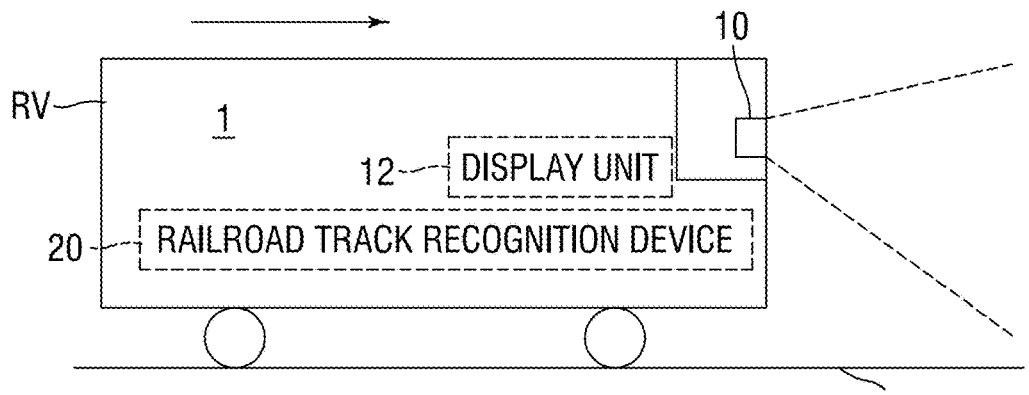
FIG. 1 is a configuration drawing of a vehicle system 1 including a railroad track recognition device 20.

Hereafter, a railroad track recognition device, a program, and a railroad track recognition method of embodiments will be described, referring to the drawings.

First Embodiment

FIG. 1 is a configuration drawing of a vehicle system 1 including a railroad track recognition device 20. The vehicle system 1 is a system mounted in a railroad vehicle RV that travels on a railroad track R. The vehicle system 1 includes, for example, a capturing unit 10 such as a camera, a display unit 12, and the railroad track recognition device 20. The capturing unit 10 is provided in a driver's seat, driver's cabin or the like of the railroad vehicle RV, and captures images in a travelling direction of the railroad vehicle RV (the direction of the arrow in FIG. 1). The capturing unit 10, for example, captures images in a direction in which the railroad track R extends, as shown in FIG. 1. The display unit 12 displays various kinds of image.

Figure 2:
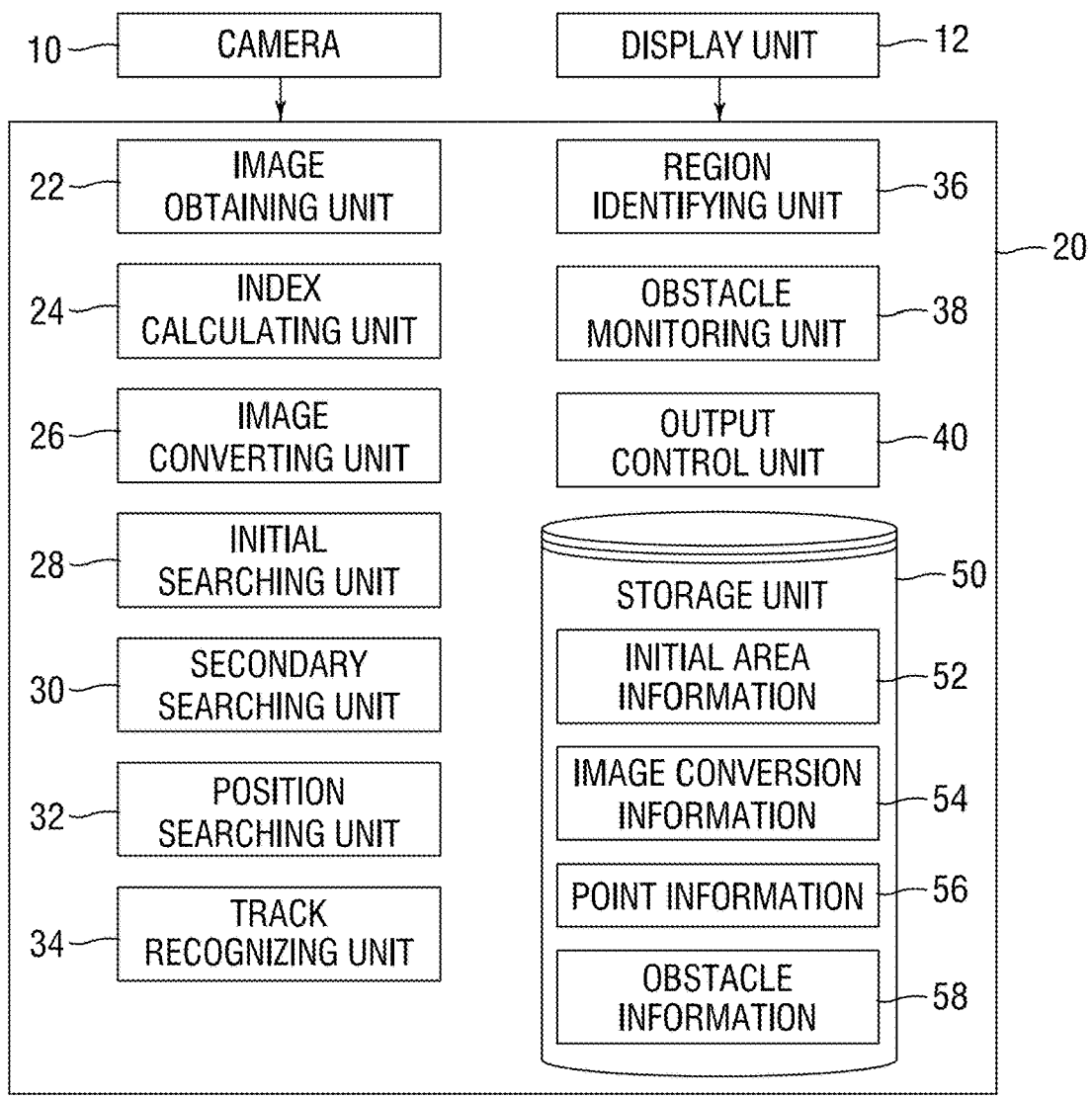
FIG. 2 is a functional configuration drawing of the railroad track recognition device 20.

FIG. 2 is a functional configuration drawing of the railroad track recognition device 20. The railroad track recognition device 20 includes, for example, an image obtaining unit 22, an index calculating unit 24, an image converting unit 26, an initial searching unit 28, a secondary searching unit 30, a point searching unit 32, a track recognizing unit 34, a region identifying unit 36, an obstacle monitoring unit 38, an output control unit 40, and a storage unit 50. Part or all of the image obtaining unit 22, the index calculating unit 24, the image converting unit 26, the initial searching unit 28, the secondary searching unit 30, the point searching unit 32, the track recognizing unit 34, the region identifying unit 36, the obstacle monitoring unit 38, and the output control unit 40 are realized by, for example, a processor such as a CPU (central processing unit) executing a program stored in the storage unit 50. Also, part or all of these functional units may be realized by hardware such as an LSI (large scale integration), an ASIC (application specific integrated circuit), or an FPGA (field-programmable gate array), and have a circuit configuration for realizing functions of the functional units, or may be realized by collaboration between software and hardware. The program may be stored in advance in a storage device such as an HDD (hard disk drive) or a flash memory, or may be stored in a removable storage medium such as a DVD or a CD-ROM, and installed in a storage device by the storage medium being mounted in a drive device.

The storage unit 50 is realized by, for example, a non-volatile storage medium such as a ROM (read only memory), a flash memory, an HDD (hard disk drive), or a memory card, and a volatile storage medium such as a RAM (random access memory) or a register. The storage unit 50 stores the program executed by the processor, and initial area information 52, image conversion information 54, point information 56, obstacle information 58, and the like, to be described hereafter.

The image obtaining unit 22 obtains an image captured by the capturing unit 10. The captured image is, for example, a color image. The index calculating unit 24, for example, converts a color image into a grayscale image or a binarized image, and generates an index indicating railroad-track-likeness for each pixel of the converted image. As a result, an index image composed of a pixel and an index (corresponding to the pixel) is obtained. Also, instead of this, the index calculating unit 24 may calculate an index indicating a railroad-track-likeness for each pixel group including a predetermined number of pixels. The image converting unit 26 converts an index image generated by the index calculating unit 24 into a bird's eye image seen from air.

In an initial area preset for a bird's eye image converted from an index image, the initial searching unit 28 comprehensively determines a plurality of line segments connecting an arbitrary point on an upper end of the initial area and an arbitrary point on a lower end of the initial area. For example, the initial searching unit 28 determines a plurality of line segments connecting at least a first point and a second point on the upper end of the initial area and at least a third point and a fourth point on the lower end respectively, and selects one line segment having a larger evaluation value, calculated by the index calculating unit 24 based on indices for pixels or pixel groups, than that of any other line segments. A "line" is a region in which pixels, or pixel groups composed of pixels, are linked in a given direction. The initial searching unit 28 selects one line segment having a larger evaluation value, calculated by the index calculating unit 24 based on indices for pixels or pixel groups on the line, than that of any other line segments. An evaluation value is a value indicating railroad-track-likeness. For example, the larger the evaluation value, the higher the probability that a line segment corresponding to the evaluation value is a railroad track. The evaluation value may be an average value of indices or may be a value determined as a result of processing the indices using a predetermined evaluation function. In the following description, it will be assumed as an example that the evaluation value is the average value of indices.

The secondary searching unit 30 selects a line segment having a larger evaluation value of indices than that of any other line segments included in a search area. The search area is the area extending toward a top of the image from, as a reference point, a point of an upper end of a line segment selected by the initial searching unit 28. Thereafter, the second searching unit 30 repeatedly selects a line segment in a new search area formed by using, as a next reference point, a point of an upper end of the line segment previously selected by the second searching unit 30. A search area extending toward the top of the image is, for example, an area having a fan-shaped form with a reference point (or a characteristic point) as a center point. Also, the search area may be an area demarcated by a first virtual line (for example, VR in FIGS. 9A and 9B) extending a predetermined distance upward in the image from the reference point and a second virtual line (for example, VL in FIGS. 9A and 9B) extending a predetermined distance upward in the image from the reference point, which form a predetermined angle, and a third virtual line connecting an upper end of the first virtual line and an upper end of the second virtual line. The third virtual line may be, for example, a straight line, or may be a curved line.

The point searching unit 32 searches a predetermined range including the upper end of a line segment selected by the initial searching unit 28 or the secondary searching unit 30, identifies a characteristic point whose index is larger than that of other points, and changes the reference point to the characteristic point.

The track recognizing unit 34 recognizes a railroad track based on results of processes by the initial searching unit 28 and the secondary searching unit 30. Specifically, the track recognizing unit 34 recognizes a line in which characteristic points identified by the point searching unit 32 are aligned as a railroad track.

The region identifying unit 36 identifies a determination region (details will be described later) in an image based on information regarding a railroad track recognized by the track recognizing unit 34. The obstacle monitoring unit 38 determines whether or not an obstacle exists in the determination region. When it is determined by the obstacle monitoring unit 38 that an obstacle exists in the determination region, the output control unit 40 correlates information indicating that an obstacle exists to an image captured by the capturing unit 10, and controls the display unit 12 to display the image.

Process Flow

Figure 3:
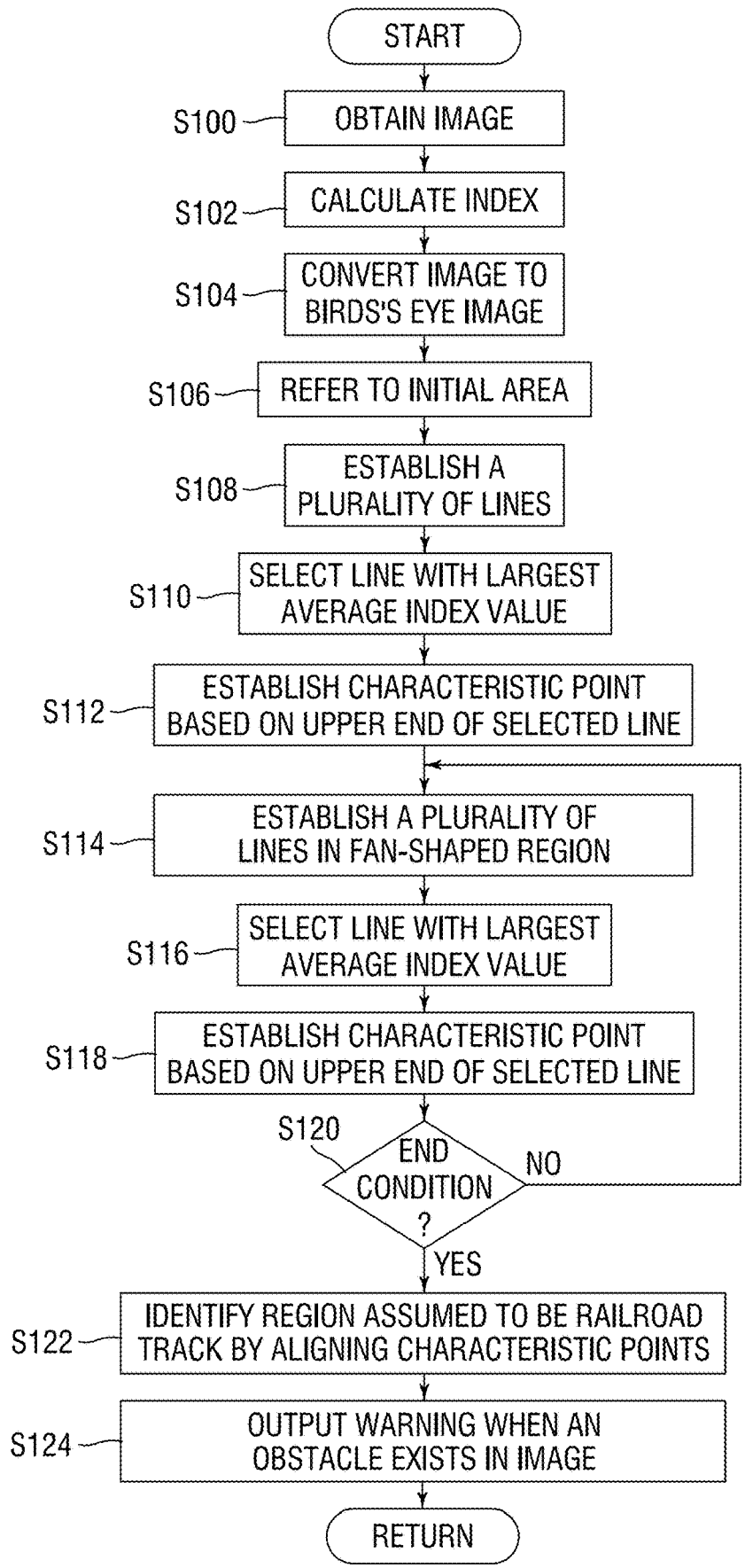
FIG. 3 is a flowchart showing a flow of a process executed by the railroad track recognition device 20.

Hereafter, a process of each functional unit heretofore described will be described while referring to a flowchart. FIG. 3 is a flowchart showing a flow of a process executed by the railroad track recognition device 20.

Firstly, the image obtaining unit 22 obtains an image (an original image) captured by the capturing unit 10 (step S100). Next, the index calculating unit 24 calculates an index based on the image obtained in step S100 (step S102). The index, which is a scale indicating railroad-track-likeness, is an index calculated based on, for example, a luminance gradient between a pixel focused on and a neighboring pixel. Also, the index may be calculated using a Sobel filter, a Laplacian filter, a Robinson filter, a Canny filter, or the like.

Figure 4:
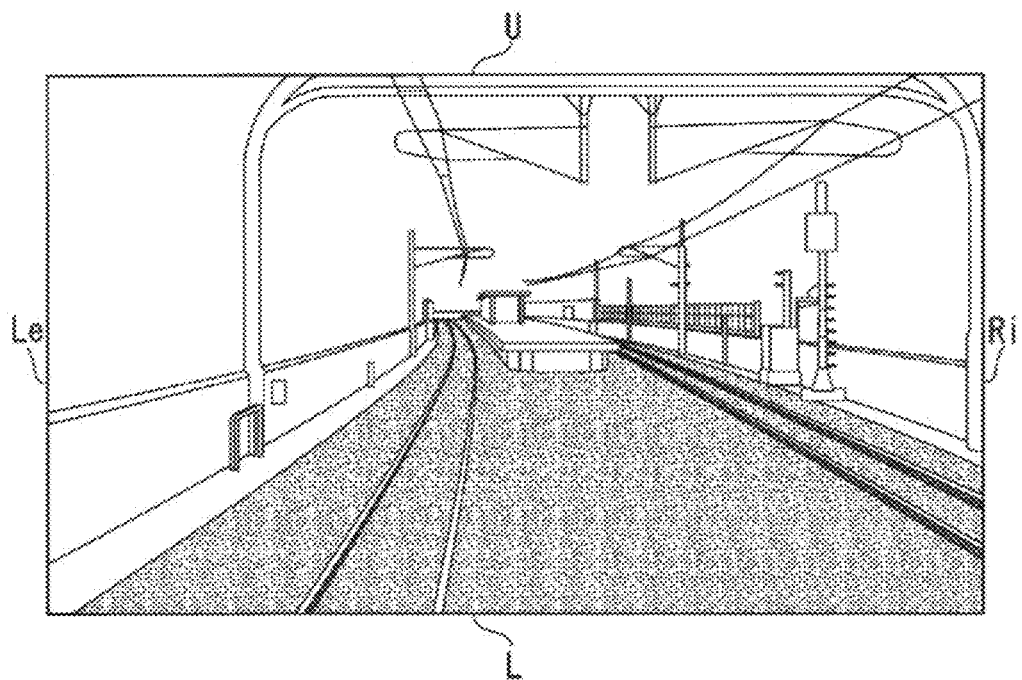
FIG. 4 is a drawing schematically showing an image captured by the capturing unit 10.

FIG. 4 is a drawing schematically showing an image captured by the capturing unit 10. In the following description, an upward direction in an image captured by the capturing unit 10 or in an image converted by the image converting unit 26 is defined as an upper end side U, a downward direction as a lower end side L, a right direction as a right end side Ri, and a left direction as a left end side Le.

Figure 5:
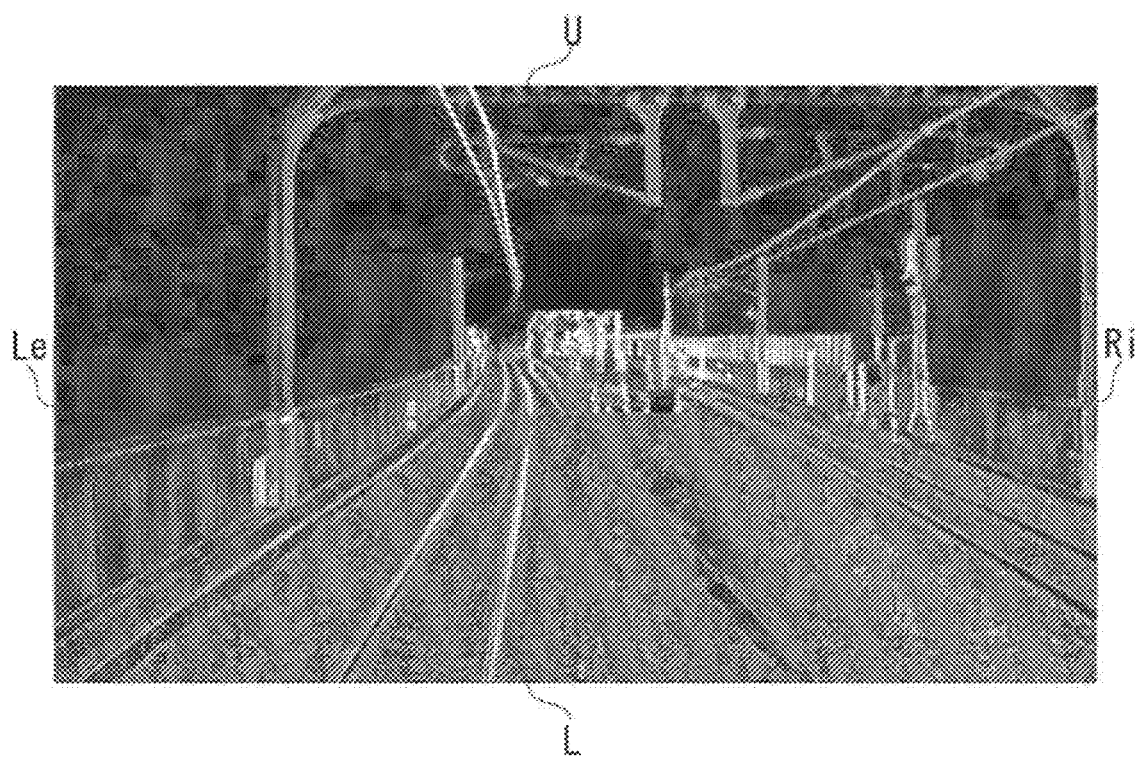
FIG. 5 is a drawing showing a result of obtaining a luminance gradient from the image shown in FIG. 4.

FIG. 5 is a drawing showing a result of obtaining a luminance gradient from the image shown in FIG. 4. A railroad track is formed of a material such as steel, and as steel has a low light reflectivity compared with stones (ballast) laid down along the railroad track, there is a large difference in luminance between pixels corresponding to the railroad track portion and pixels in the periphery thereof. As a result, there is a large luminance gradient in a region corresponding to the railroad track portion, as shown in FIG. 5.

Figure 6:
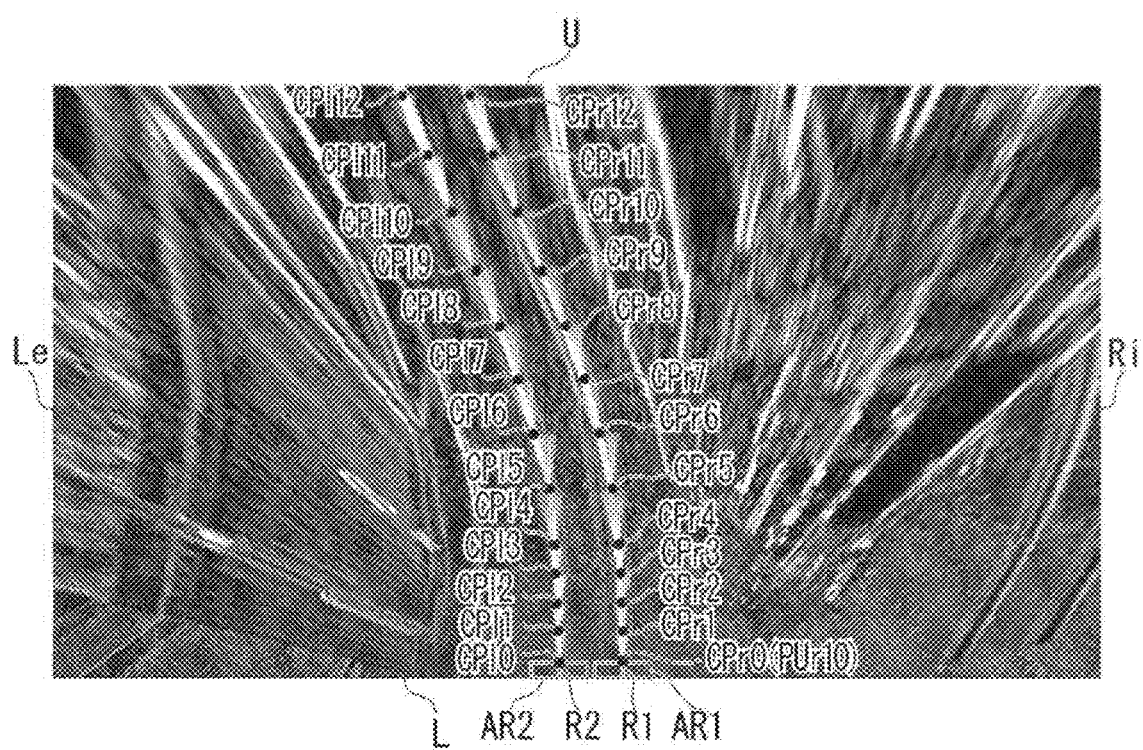
FIG. 6 is a drawing showing an example of a bird's eye image after a luminance gradient is obtained.

Next, the image converting unit 26, referring to the image conversion information 54, converts the image (original image) obtained in step S100 into a bird's eye image (step S104). An index in the original image is imparted to a point in the bird's eye image corresponding to the point from which the index is derived. The image conversion information 54 is information indicating a preset conversion rules for converting an original image captured by the capturing unit 10 into a bird's eye image. The image conversion information 54 may be a map wherein pixels of the bird's eye image are correlated to pixels of the original image or may be a function that outputs coordinates in the bird's eye image when coordinates in the original image are input. FIG. 6 is a drawing showing an example of a bird's eye image after a luminance gradient is obtained. A detailed description of FIG. 6 will be given hereafter.

Next, the initial searching unit 28 refers to the initial area information 52 stored in the storage unit 50 (step S106), and determines a plurality of lines connecting one arbitrary point in an upper end and one arbitrary point in a lower end of an initial area in the bird's eye image (step S108). The initial area information 52 is information indicating a range of an area that is an area preset in the bird's eye image, includes a railroad track along which the railroad vehicle RV travels, and is positioned on the lower end side L of the bird's eye image. The area information 52 is obtained in advance based on, for example, a installed position of the capturing unit 10 in the railroad vehicle RV, and a region captured by the capturing unit 10 from the installed position. In the previously mentioned example of FIG. 6, an area AR1 including a railroad track R1 on the right end side Ri and an area AR2 including a railroad track R2 on the left end side Le are to initial areas.

Figure 7:
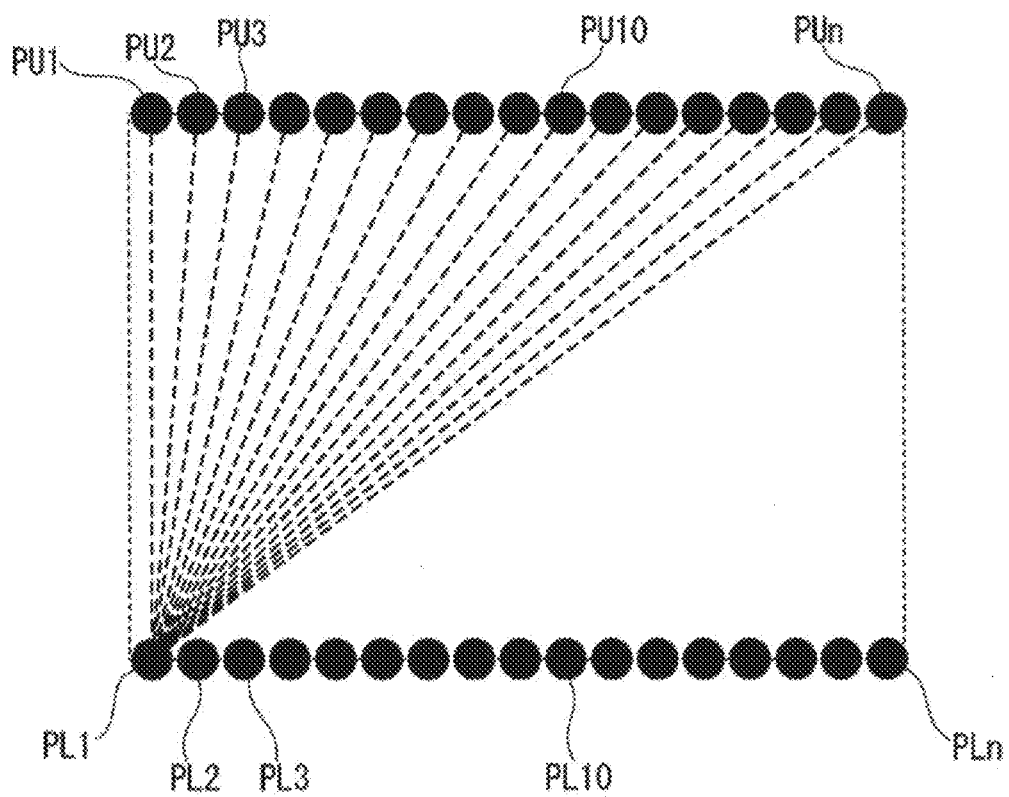
FIG. 7 is a drawing showing an aspect wherein a plurality of lines are established in an initial area AR1.

FIG. 7 is a drawing showing an aspect that a plurality of lines are established in the initial area AR1. In FIG. 7, a plurality of lines connecting one arbitrary point among points (pixels or pixel groups) PU1 to PUn on the upper end side U of the initial area AR1 and one arbitrary point among points (pixels or pixel groups) PL1 to PLn on the lower end side L of the initial area AR1 are comprehensively determined ("n" is an arbitrary positive integer). In the example shown, a case where the point PL1 is connected to each of PU1 to PUn is shown, but in the process of step S108, lines comprehensively connecting each of the points PL1 to PLn and each of the points PU1 to PUn are determined. Also, the same process is carried out as for the initial area AR2.

Next, the initial searching unit 28 selects one line segment, in each of the initial areas AR1 and AR2, having a larger average index value calculated from indices than that of any other line segments (step S110). More specifically, the initial searching unit 28 refers to the image conversion information 54, and selects the one line segment having the largest average index value based on indices corresponding to pixels included in the plurality of line segments in the bird's eye image. By this process, two lines approximating lines composed of pixels corresponding to the railroad tracks R1 and R2, shown in FIG. 6, are selected.

Next, the point searching unit 32 searches a predetermined area of the bird's eye image including an upper end (reference point) of the line segment selected by the initial searching unit 28, identifies a characteristic point whose index is larger than that of other points, and changes the reference point to the characteristic point (step S112). The predetermined area is a line segment area having a predetermined width in a horizontal direction from the reference point identified by the point searching unit 32. The predetermined area may also be provided with width in a vertical direction from the reference point identified by the point searching unit 32, forming a rectangular area. Also, information (coordinates) regarding the identified characteristic point is stored in the storage unit 50 as the point information 56, to be described hereafter.

Figure 8:
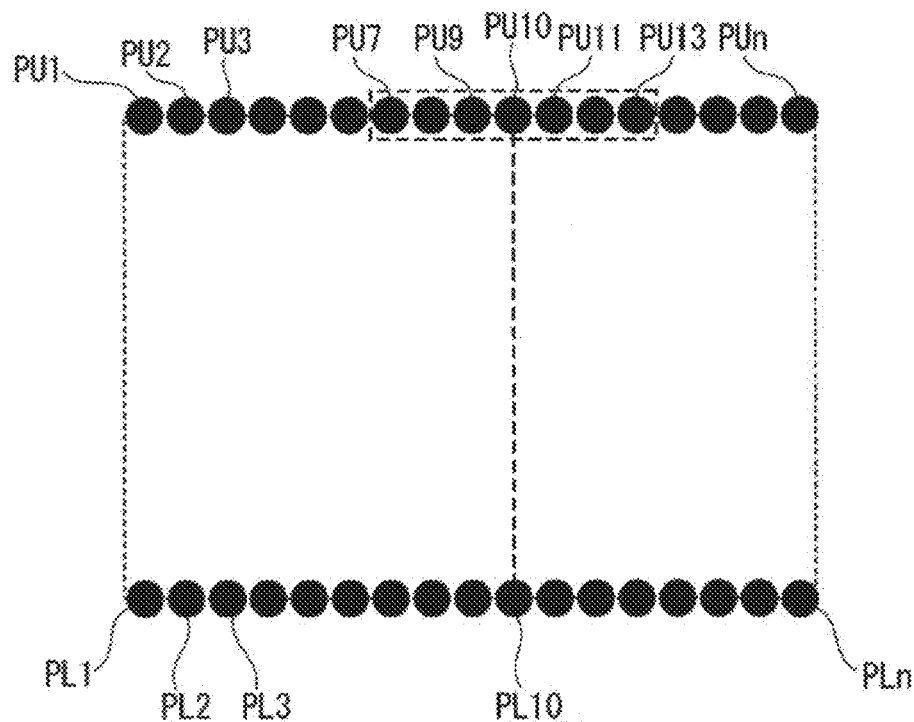
FIG. 8 is a drawing for describing a process of identifying a characteristic point.

FIG. 8 is a drawing for describing a process of identifying a characteristic point. A description the same as that for FIG. 7 will be omitted. For example, it is assumed that the initial searching unit 28 determines a line connecting the point PL10 and the point PU10 included in the initial area AR1 as the line segment having the largest average index value according to the process of step S110. In this case, the point searching unit 32 compares the indices of each of the point PU10 and the points PU7 to PU9 and PU11 to PU13 extending in the horizontal direction from the point PU10, and selects, for example, the pixel having the largest index as the characteristic point. In the embodiment, it is assumed that the position Pu11 is selected as the characteristic point.

Figure 9A:
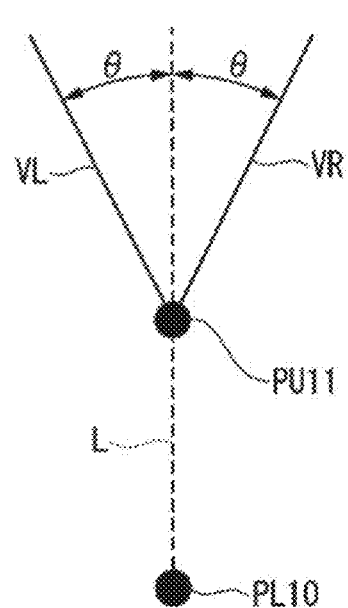
FIG. 9A is a drawing for describing a process of establishing a plurality of lines based on a characteristic point.
Figure 9B:
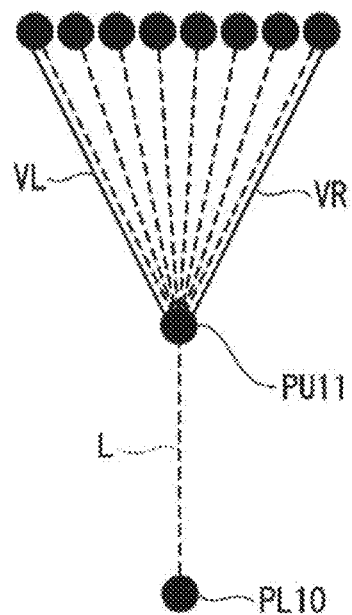
FIG. 9B is a drawing for describing a process of establishing a plurality of lines based on a characteristic point.

Next, the secondary searching unit 30 determines a plurality of line segments in a fan-shaped area (search area) in the bird's eye image based on the characteristic point identified by the point searching unit 32 (step S114). FIGS. 9A and 9B are a drawing for explaining a process of determining a plurality of line segments based on a characteristic point. For example, the secondary searching unit 30 establishes an area of a fan shape (or approximate fan shape) based on the characteristic point Pu11 identified by the point searching unit 32, as shown in FIG. 9A. The fan-shaped area is an area demarcated by the virtual lines VR and VL, drawn from the characteristic point Pu11 selected by the point searching unit 32 and extending in the upper end side U direction on both sides of a line segment L selected by the initial searching unit 28. The virtual line VR is on the right end side Ri of the line segment L and has an angle $\theta$ with the line segment L, and the virtual line segment VL is on the left end side Li of the line segment L and has the angle $\theta$ with the line segment L.

The angle $\theta$ is a preset angle, and is, for example, an angle that can cover (encompass) a range of a maximum curvature regulated by a railroad track standard or the like. Also, lengths of the virtual lines VR and VL are preset lengths. Further, the secondary searching unit 30 determines a plurality of line segments comprehensively connecting one arbitrary point in an upper end of the fan-shaped area and the characteristic point Pu11, as shown in FIG. 9B. For example, the secondary searching unit 30 determines a plurality of points at preset predetermined distance in the horizontal direction on the upper end of the fan-shaped area, and determines a plurality of line segments comprehensively connecting each of the determined points and the characteristic point PU11. The secondary searching unit 30 carries out a process the same as the heretofore described process based on the characteristic point identified in the initial area AR2.

Next, the secondary searching unit 30 determines a line segment, from the determined plurality of line segments, having a larger average index value than that of any other line segments (step S116). More specifically, the secondary searching unit 30 refers to the image conversion information 54, and determines the line segment whose average index value is larger than the other line segments based on indices corresponding to pixels included in the plurality of line segments in the bird's eye image.

Next, the point searching unit 32 searches a predetermined area of the bird's eye image including an upper end (reference point) of the line segment selected by the secondary searching unit 30, identifies a characteristic point whose index is larger than that of other points, and changes the reference point to the characteristic point (step S118).

Next, the point searching unit 32 determines whether or not an end condition is satisfied (step S120). The end condition is that an distance between two reference points (or characteristic points) identified with the initial area AR1 and the initial area AR2 as origins is equal to or lower than a threshold, that the process of identifying a reference point carried out by the point searching unit 32 has been carried out a predetermined number of times, that a reference point identified by the point searching unit 32 is farther to the upper end side than a predetermined point in the bird's eye image, or the like.

When the end condition is not satisfied, the process of steps S114 to S118 is repeated. In this case, the secondary searching unit 30 determines a plurality of line segments in step S114 based on the characteristic point identified in step S118. By repeatedly executing the process of steps S114 to S118, characteristic points are selected at predetermined distance toward the upper end side U.

Here, an explanation is made as to FIG. 6. As shown in FIG. 6, a characteristic point CPr1 is identified by using a characteristic point of the initial area AR1, a characteristic point CPr2 is identified by using the characteristic point CPr1, and finally a characteristic point CPr12 is identified. In the same way, a characteristic point CPl1 is identified by using a characteristic point of the initial area AR2, a characteristic point CPl2 is identified by using the characteristic position CPl1, and finally a characteristic position CPl12 is identified.

Also, information (coordinates) regarding identified characteristic points are stored in the storage unit 50 as the point information 56. FIG. 10 is a drawing showing details of the point information 56. The point information 56 is information indicating coordinates in an image (bird's eye image) of a characteristic point identified by the point searching unit 32. The point information 56 is, for example, arranged in accordance with an order of identified characteristic points. Specifically, characteristic points in the point information 56 are arranged in order of a starting point of a line segment selected in an initial area by the initial searching unit 28, a first characteristic point identified by the point searching unit 32, a second characteristic point identified by the position searching unit 32, and finally an Nth ("N" is an arbitrary positive integer) characteristic point identified by the point searching unit 32. Also, identification information indicating a characteristic point on the right end side, or identification information indicating a characteristic point on the left end side, is correlated to a characteristic point identified by the point searching unit 32 in the point information 56.

Figure 11:
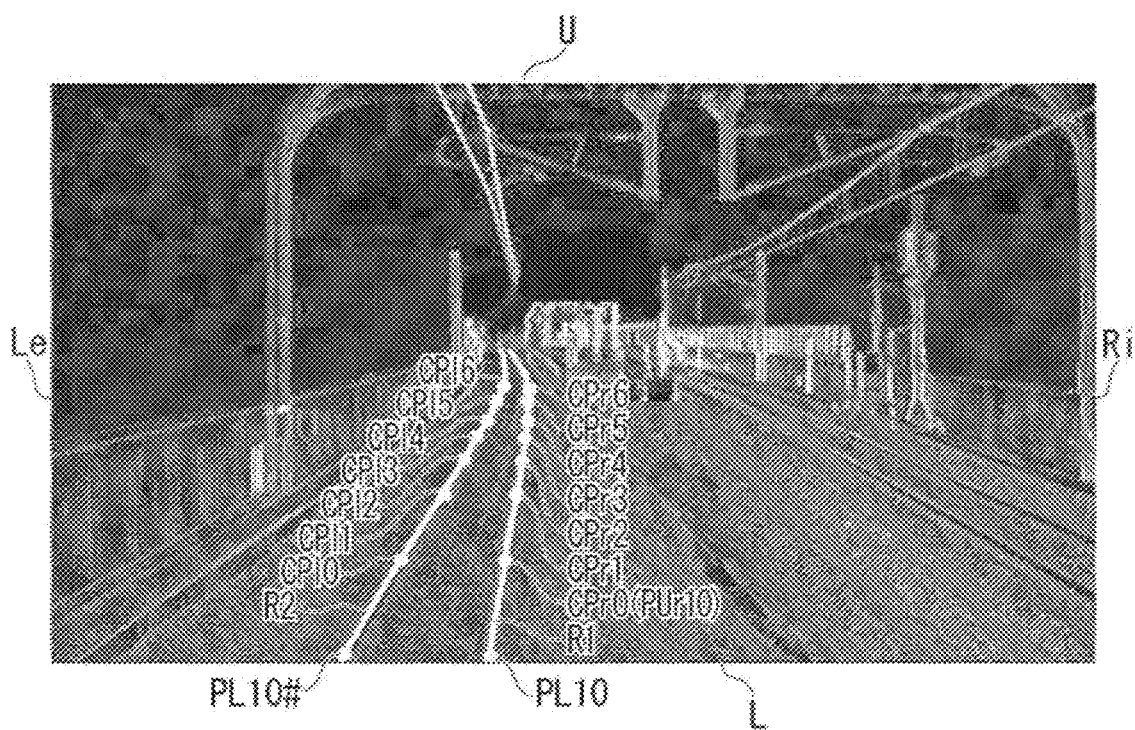
FIG. 11 is a drawing showing an original image in which characteristic points are plotted.

When the end condition is satisfied, the track recognizing unit 34 refers to the point information 56, and identifies a region assumed to be a railroad track by connecting characteristic points identified by the point search unit 32 (step S122). Specifically, the track recognizing unit 34 refers to the point information 56, and plots characteristic points identified by the point searching unit 32 in an original image. FIG. 11 is a drawing showing an original image in which characteristic points are plotted. For example, as shown in the drawing, characteristic points (CPl0, CPr0 (=PUr10)) identified by the point searching unit 32, and first characteristic points (CPl1, CPr1) to Nth (for example, CPl2, CPr2 to CPl6, CPr6, and the like) characteristic points identified by the point searching unit 32, are plotted.

Furthermore, the track recognizing unit 34 refers to the point information 56, connects a starting point (PL10, PL10#) of a line segment selected in an initial area and a first characteristic point identified by the point searching unit 32, connects the first characteristic point and a second characteristic point, and finally connects an N-1st characteristic point and an Nth characteristic point. This process is carried out with respect to characteristic points on the left end side and characteristic points on the right end side. By the process being carried out in this way, the regions R1 and R2 assumed to be railroad tracks are identified. In the above process, coordinates of characteristic points corresponding to a bird's eye image included in the point information 56 may be output to another functional unit or device as they are, or the characteristic points may be plotted in a bird's eye image.

Next, the railroad track recognition device 20 determines whether or not a suspicious object exists in a vicinity of the railroad tracks, and controls the display unit 12 to display a warning when the suspicious object exists (step S124). For example, firstly, the region identifying unit 36 identifies a determination region. The determination region is a region demarcated by the railroad tracks R1 and R2 and a region in a vicinity thereof, and is a region in which any suspicious object existing is not allowed.

Figure 12:
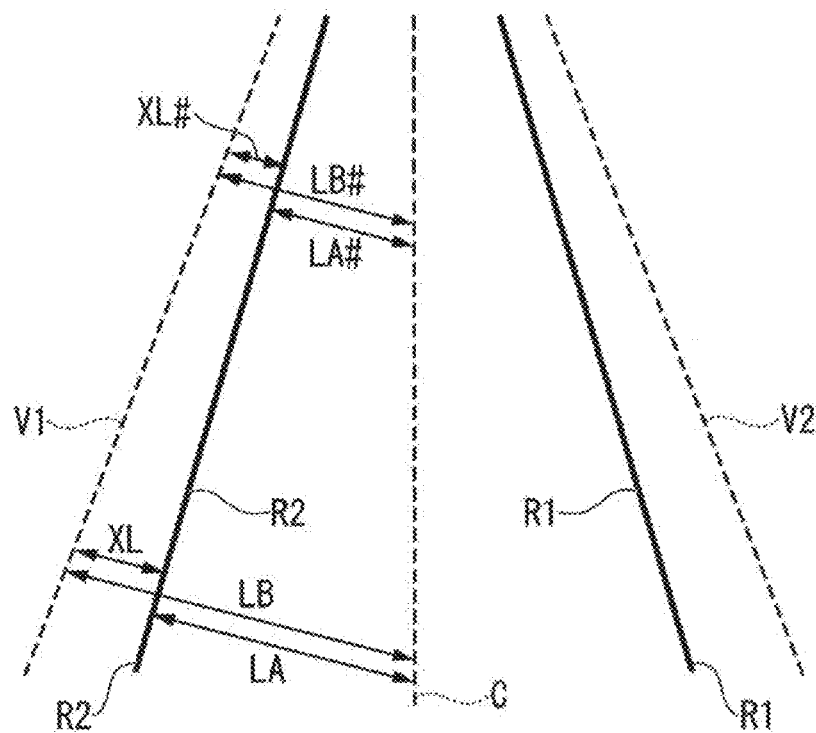
FIG. 12 is a drawing for describing an example of a determination region.

FIG. 12 is a drawing for describing an example of a determination region. The region identifying unit 36, for example, identifies a central line C that intersects a center of width in a horizontal direction between the railroad track R1 and the railroad track R2 in a predetermined position in an original image, and identifies a length LA of a line extending in a normal direction from the railroad track R2 to the central line C. Also, the region identifying unit 36 identifies a length LB (a reference length) based on the identified length LA. The length LB is a length such that a length XL is added to a left end of the length LA. The length XL is a length by which the railroad vehicle RV protrudes in a width direction beyond the railroad track R2 when the railroad vehicle RV travels along the railroad track, or a length such that a predetermined length is added to the length by which the railroad vehicle RV protrudes. The length XL is stored in, for example, the storage unit 50.

Furthermore, the region identifying unit 36, for example, identifies the central line C, which intersects the center of the width between the railroad track R1 and the railroad track R2 in the horizontal direction, farther to the upper end side in the original image than the position in which the length LB has previously been obtained, and identifies a length LA# of a line extending in the normal direction from the railroad track R2 to the central line C. Also, the region identifying unit 36 identifies a length LB# (a reference length) based on the identified length LA#. A ratio between the length LA# and the length LB# is the same as a ratio between the length LA and the length LB. The region identifying unit 36 obtains a reference length farther to the upper end side U than a position in which a reference length has previously been obtained as far as a vicinity in which the railroad tracks cannot be detected in the original image. The above described process is carried out in the same way as to the railroad track R1. Further, the region identifying unit 36 assumes a region demarcated by the virtual line V1 and the virtual line V2 to be the determination region. The virtual lines V1 and V2 are respectively obtained by connecting the left ends of the reference lengths in order of obtaining and connecting the right ends of the reference lengths in order of obtaining.

Also, the suspicious object monitoring unit 38, for example, referring to the suspicious object information 58 and using an index calculated by the index calculating unit 24, determines whether or not an image region matching with a suspicious object template exists within the determination region in the original image. For example, a plurality of suspicious object templates are stored in the suspicious object information 58. The matching does not only mean a perfect match but does mean a situation in which a similarity between a shape of an image region and any of suspicious object templates satisfies a given condition, for example the similarity is equal to or greater than a threshold, including the perfect match. The suspicious object monitoring unit 38 may acquire an image captured by a stereo camera, and determine whether or not a suspicious object exists based on the captured image and the suspicious object information 58. In this case, a template indicating a three-dimensional shape of a suspicious object is included in the suspicious object information 58.

Figure 13:
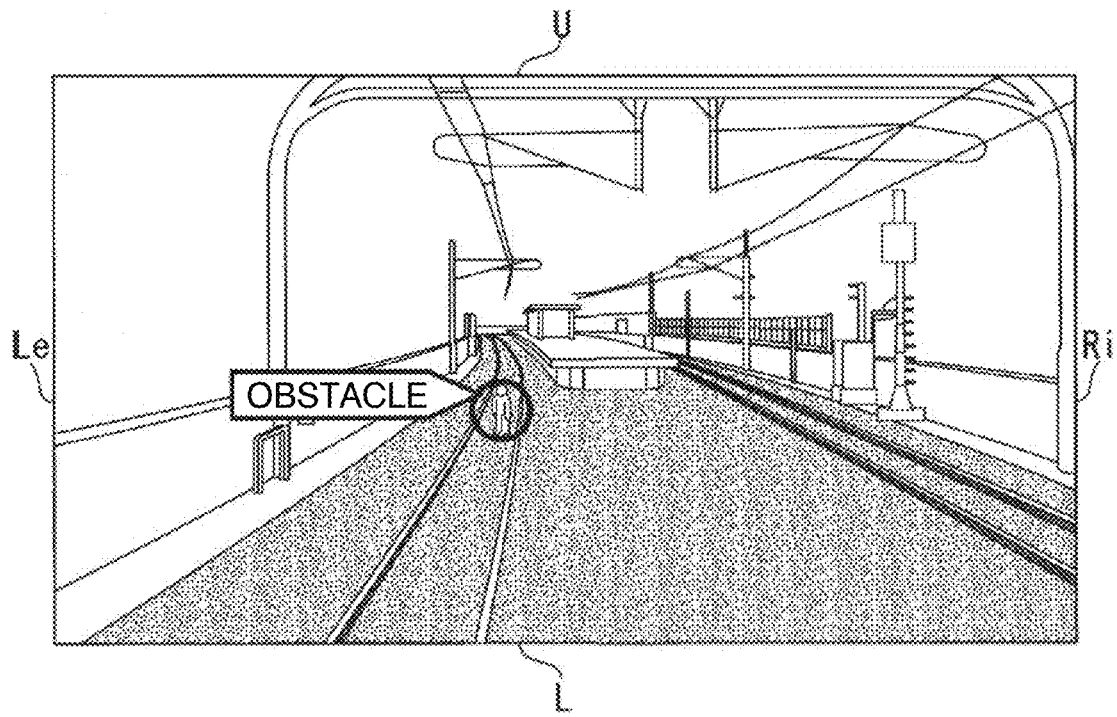
FIG. 13 is a drawing schematically showing a processed image.

When it is determined by the suspicious object monitoring unit 38 that a suspicious object exists within the determination region, the output control unit 40 acquires information regarding the image region corresponding to the suspicious object from the suspicious object monitoring unit 38, identifies the acquired image region, and correlates information, indicating that a suspicious object exists in the identified image region, to the original image. Further, the output control unit 40 controls the display unit 12 to display the processed image on which the heretofore described process has been carried out. FIG. 13 is a drawing schematically showing a processed image. For example, when a scene that a person is in a determination region is captured by the capturing unit 10, a processed image including information indicating that a suspicious object exists is displayed on the display unit 12. The output control unit 40 may control a warning to be output by a speaker or the like provided in the railroad vehicle RV. By so doing, an occupant of the railroad vehicle RV can recognize that a suspicious object exists in the travelling direction of the railroad vehicle RV. Further, the occupant can control the railroad vehicle RV taking the existence of the suspicious object into consideration.

According to the heretofore described process, the railroad track recognition device 20 can more accurately detect a railroad track. Also, when a suspicious object exists within a detected railroad track, the railroad track recognition device 20 can notify an occupant with information indicating that the suspicious object exists.

Also, when a difference between inclinations of line segments obtained by the process of step S110 or step S116 is equal to or greater than a reference angle, the inclination may be adjusted. By so doing, even when an object interferes with one railroad track (the railroad track on the right side or the left side), and a line segment differing from the railroad track is selected, the railroad track with which the object is assumed to be interfering is complemented based on the other railroad track. As a result, a region approximating the railroad track with which the object is interfering can be identified in the image.

Also, when the width between two selected line segments exceeds a threshold preset based on width between railroad tracks in the process described above, the initial searching unit 28 or the secondary searching unit 30 may implement an adjustment so that the width between the two line segments is equal to or less than the threshold. For example, the initial searching unit 28 brings the two railroad tracks closer to each other evenly. By so doing, a railroad track can be more accurately detected.

Also, in the process described above, the secondary searching unit 30 can more accurately identify a reference point by selecting a line segment whose average index value is larger than the other line segments from a plurality of line segments determined in a fan-shaped area established in a bird's eye image. In particular, the secondary searching unit 30 can accurately identify a reference point on the upper end side U (that is, a region far from a train) in an original image.

Also, in the process described above, a predetermined area in a bird's eye image including an upper end of a line segment selected by the initial searching unit 28 or the secondary searching unit 30 is searched, and a characteristic point whose index is larger than that of other points is identified. As a pixel having the largest index is selected as a characteristic point, a reference point on the selected line segment is adjusted to the characteristic point which is a point much closer to a railroad track even when the line segment selected based on an average index value in step S110 or step S116 differs from an actual railroad track. Also, when an actual railroad track is curving, a point corresponding to the railroad track is more accurately identified by adjusting the reference point on the selected line segment in the same way.

A process of changing of a reference point to a characteristic point may be omitted. In this case, information regarding the reference point is stored in the point information 56. Further, a region assumed to be a railroad track is a region generated by connecting the reference points. Also, in this case, a search area is an area having a fan-shaped form with a reference point as a center point.

Also, in the process described above, when the secondary searching unit 30 determines a plurality of line segments, the virtual lines VR and VL are established centered on the line L selected by the initial searching unit 28 or the secondary searching unit 30, however it is not limited thereto. For example, the secondary searching unit 30 may establish the virtual lines VR and VL taking a line segment selected by a process before the previous process into consideration.

Figure 14:
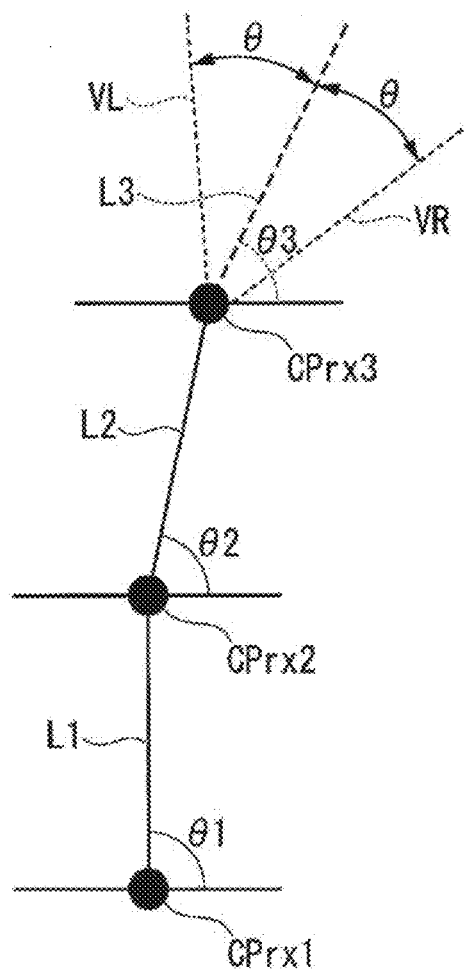
FIG. 14 is a drawing for describing an establishment of a virtual line.

FIG. 14 is a drawing for describing an establishment of a virtual line. For example, it is assumed that reference points CPrx1 to CPrx3 are identified in this order. Also, it is assumed that when a plurality of line segments are determined based on the reference point CPrx1, an angle formed by a line L1, which forms a reference (center) when a virtual line is established, and a line extending in a horizontal direction in a bird's eye image is an angle θ1. It is assumed that when a plurality of line segments are determined based on the reference point CPrx2, an angle formed by a line L2, which forms a reference when a virtual line is established, and a line extending in the horizontal direction in the bird's eye image is an angle θ2. Also, it is assumed that when a plurality of line segments are determined based on the reference point CPrx3, an angle formed by a line L3, which forms a reference when a virtual line is established, and a line extending in the horizontal direction in the bird's eye image is an angle θ3. In this case, the angle θ3 is calculated based on an Equation (1). By the angle θ3 being calculated in this way, a plurality of line segments reflecting a curvature of a railroad track can be identified, and a railroad track can be more reliably included in a search area. The angle θ in FIG. 14 is the angle θ that can cover a range of a maximum curvature regulated by a railroad track standard or the like described using FIG. 9.

$$\theta 3 = \theta 2 + (\theta 2 - \theta 1) \tag{1}$$

According to the first embodiment, the railroad track recognition device 20 has an initial searching unit 28 that, in an initial area preset in an image, determines a plurality of line segments connecting arbitrary points in an upper end of the initial area and arbitrary points in a lower end, and selects one line segment having a larger evaluation value of indices, calculated by the index calculating unit 24 and indicating railroad-track-likeness, than that of any other line segments, the secondary searching unit 30, which selects a line segment having a larger evaluation value of indices than that of any other line segments included in a search area, and the rail recognizing unit 34, which identifies a railroad track based on results of processes by the initial searching unit 28 and the secondary searching unit 30, whereby a railroad track can be more accurately detected.

Second Embodiment

In the first embodiment, a description has been given assuming that a single track is identified. As opposed to this, multiple tracks are identified in a second embodiment.

Hereafter, a description will mainly be given as to differences from the first embodiment.

Figure 15:
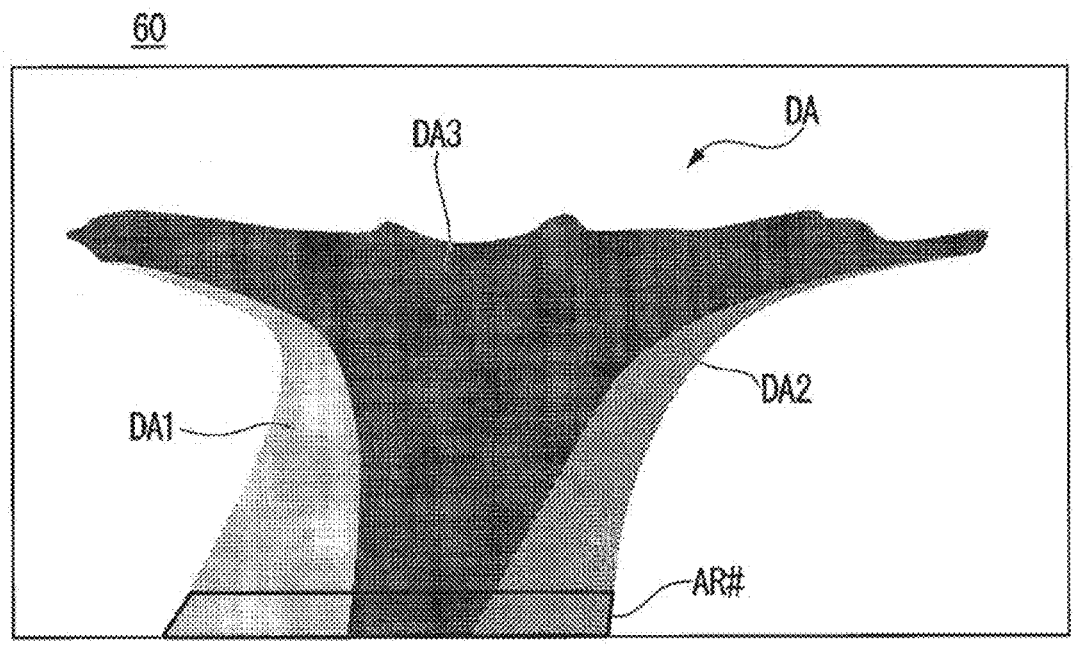
FIG. 15 is a drawing showing an example of an original image in which railroad track distribution information 60 is reflected.

For example, railroad track distribution information 60 is stored in the storage unit 50 of the second embodiment. The railroad track distribution information 60 is information indicating a region in an image (an original image or a bird's eye image) where there is a high possibility of it being assumed that railroad tracks exist. The railroad track distribution information 60 is, for example, information obtained experimentally. FIG. 15 is a drawing showing an example of an original image in which the railroad track distribution information 60 is reflected. In FIG. 15, a region DA is a distribution region where there is a high possibility of it being assumed that railroad tracks exist. The region DA includes a region DA1, a region DA2, and a region DA3. The region DA1 is a distribution region where there is a possibility of a left-side track, of left and right tracks along which the railroad vehicle RV travels, existing, and the region DA2 is a distribution region where which there is a possibility of a right-side track, of the left and right tracks along which the railroad vehicle RV travels, existing. Also, the region DA3 is a distribution region where there is a possibility of the left-side or the right-side track, or the left-side and the right-side tracks, along which the railroad vehicle RV travels existing.

Also, an initial area AR# is correlated to the railroad track distribution information 60. In the example shown in FIG. 15, the region DA corresponding to a railroad track along which the railroad vehicle RV in which the railroad track recognition device 20 is mounted travels is shown, but furthermore, a distribution region where a railroad track (for example, a neighboring railroad track) differing from the railroad track along which the railroad vehicle RV in which the railroad track recognition device 20 is mounted travels is assumed to exist is included in the railroad track distribution information 60.

In the initial area AR#, the initial searching unit 28 determines a plurality of line segments connecting arbitrary points in an upper end of the initial area AR# and arbitrary points in a lower end, selects two line segments having the largest evaluation value of indices and the second largest evaluation value of indices, calculated by the index calculating unit 24, from the determined line segments, and recognizes the two line segments to be railroad tracks. Also, the initial searching unit 28 carries out the same process as described above in an initial area (not shown) corresponding to a railroad track differing from the railroad track along which the railroad vehicle RV in which the railroad track recognition device 20 is mounted travels, and recognizes the two line segments to be railroad tracks differing from the railroad tracks along which the railroad vehicle RV in which the railroad track recognition device 20 is mounted travels. Further, when the two recognized railroad tracks satisfy a predetermined condition, the initial searching unit 28 detects that the assumed recognized tracks are railroad tracks. A predetermined condition is that, for example, a distance between left sides (or right sides) of the two railroad tracks in a horizontal direction in a bird's eye image of the railroad tracks satisfies a set standard (distance range).

In a subsequent process, the point searching unit 32 carries out the same process as in the first embodiment on each of the selected line segments, establishing reference points corresponding to the railroad tracks along which the railroad vehicle RV travels and the railroad tracks differing from that railroad tracks on which the railroad vehicle RV travels.

According to the second embodiment, the railroad track recognition device 20, in an initial area preset for each railroad track in an image, determines a plurality of line segments connecting arbitrary points in an upper end of the initial area and arbitrary points in a lower end, selects two line segments having the highest evaluation value of indices and the second largest evaluation value of indices from the determined plurality of line segments, and carries out the same process as in the first embodiment on each of the selected line segments, whereby a multiple of tracks can be identified.

Third Embodiment

In a third embodiment, a railroad track is identified by referring to past processing results of the railroad track recognition device 20. Hereafter, a description will mainly be given as to differences from the first embodiment.

Figure 16:
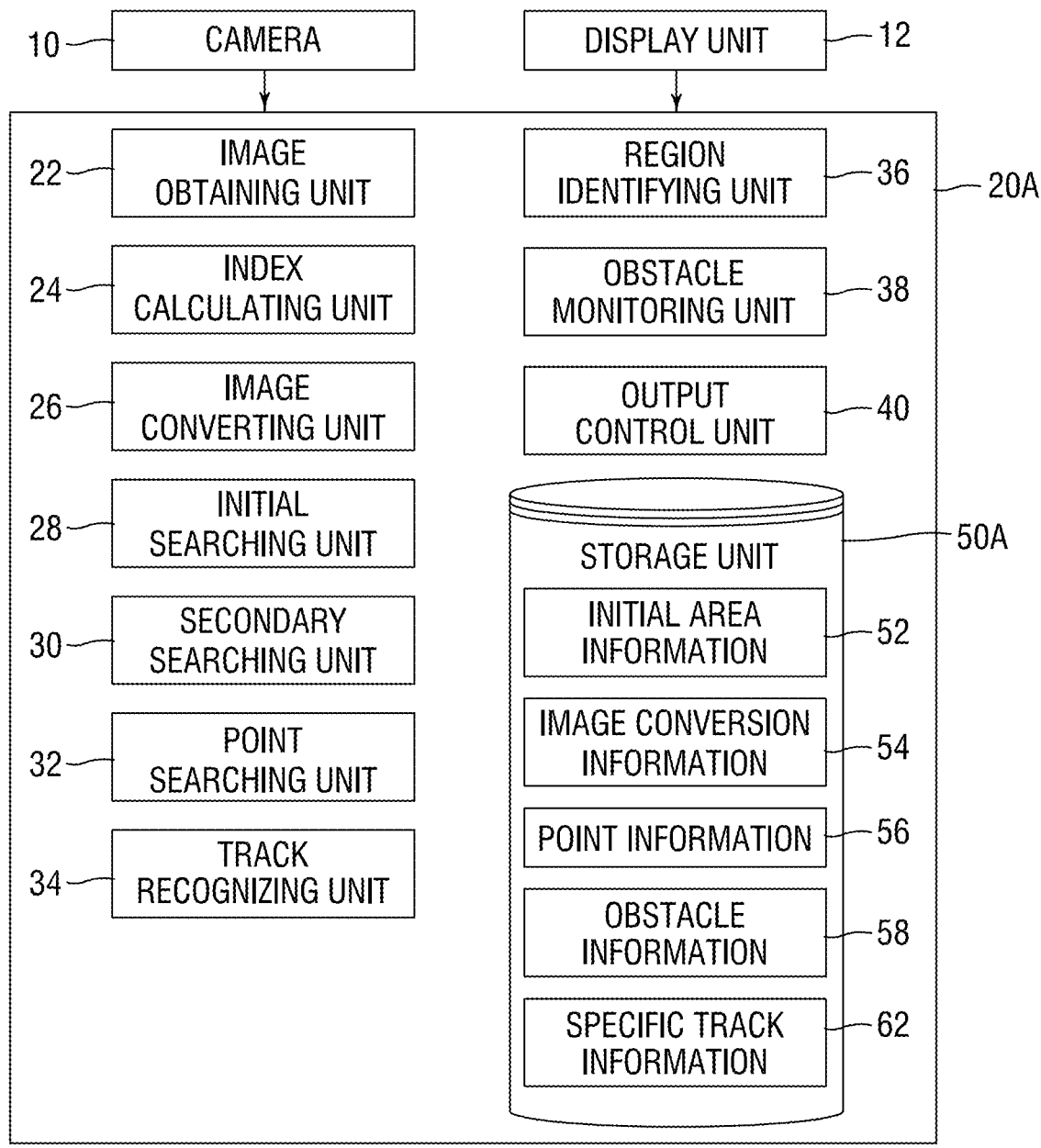
FIG. 16 is a drawing showing a functional configuration of a railroad track recognition device 20A of a third embodiment.

FIG. 16 is a drawing showing a functional configuration of a railroad track recognition device 20A of the third embodiment. The railroad track recognition device 20A includes an initial searching unit 28A and a storage unit 50A instead of the initial searching unit 28 and the storage unit 50 of the first embodiment. Identified rail information 62 is stored in the storage unit 50A. The identified rail information 62 is information regarding a reference point identified in the past, and information regarding a region assumed to be a railroad track identified by the track recognizing unit 34.

Figure 17:
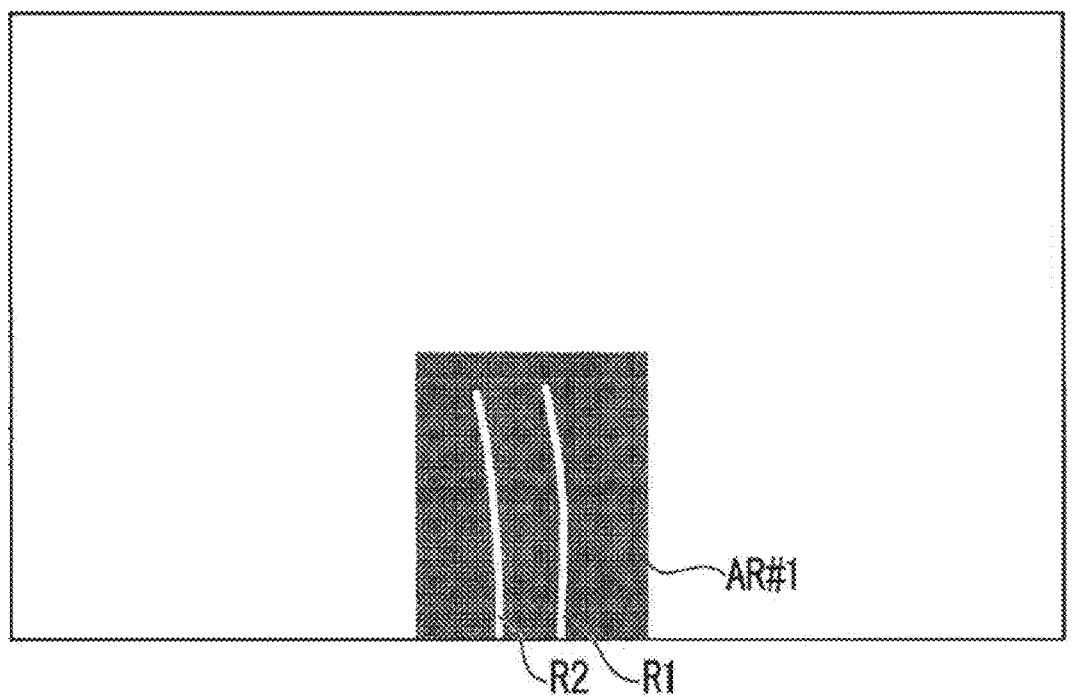
FIG. 17 is a drawing for describing a process of establishing an initial area.

The initial searching unit 28A refers to the identified rail information 62, and establishes an initial area. FIG. 17 is a drawing for describing a process of establishing an initial area. The initial searching unit 28A plots the regions R1 and R2 previously assumed to be railroad tracks on the previous occasion (the regions R1 and R2 assumed to be railroad tracks a predetermined time before) and included in the specific track information 62 on a bird's eye image that is a processing target, and establishes a predetermined region encompassing the plotted region R1 and region R2 as an initial area AR#1. The initial searching unit 28A, in the initial area AR#1, determines a plurality of line segments connecting arbitrary points in an upper end of the initial area AR#1 and arbitrary points in a lower end, and selects a line segment having a larger evaluation value of indices, calculated by the index calculating unit 24, than that of any other line segments. Further, the railroad track recognition device 20A identifies a reference point in the same way as in the first embodiment, thereby identifying a region assumed to be a railroad track.

According to the third embodiment, the railroad track recognition device 20 determines the initial area AR#1 by referring to the regions R1 and R2 previously assumed to be railroad tracks and included in the identified rail information 62, whereby the same advantages as in the first embodiment can be obtained.

According to at least one of the embodiments, a railroad track can be more accurately detected by equipping with an index calculating unit that calculates an index indicating railroad-track-likeness for each pixel or pixel group in an image in a travelling direction a railroad vehicle, an initial searching unit that, in an initial area preset in the image, determines a plurality of line segments connecting at least a first point and a second point in an upper end of the initial area and at least a third point and a fourth point in a lower end respectively, and selects a line segment having a larger evaluation value of indices, calculated by the index calculating unit for pixels or pixel groups, than that of any other line segments, a secondary searching unit that, with a point of an upper end of a line segment selected by the initial searching unit as a first reference point, selects a line segment from line segments included in a search area extending toward a top of the image for which the evaluation value of indices is greater than the evaluation value of indices of other line segments, and repeatedly executes an adoption of the upper end of the selected line segment as the next reference point, and a railroad track recognizing unit that derives a railroad track based on results of processes by the initial searching unit and the secondary searching unit.

Although some embodiments of the invention have been described, these embodiments are presented as examples, and are not intended to limit the scope of the invention. The embodiments can be implemented in various other forms, and various omissions, replacements, and changes can be carried out without departing from the gist of the invention. The embodiments and modifications thereof are included in the scope and gist of the invention, and in the same way, are included in the invention described in the patent claims and an equivalent scope thereof.

The invention claimed is:

1. A railroad track recognition apparatus comprising:
   an index calculating unit which calculates an index value, to be used for evaluating railroad-track-likeness, for each pixel or pixel group of a captured image captured by capturing device on a train vehicle;
   an initial searching unit which determines a first plurality of line segments between each of multiple points on a first end side of an initial search area and each of multiple points on a second end side of the initial search area, and selects, based on an evaluation value obtained from the index values of the pixels or the index values of the pixel groups calculated by the index calculating unit, a line segment having a larger evaluation value than that of the other line segments;
   a secondary searching unit which determines a second plurality of line segments between a reference point on an end of the line segment selected by the initial searching unit and each of multiple points on an end side of a second search area or determines a third plurality of line segments between a previous reference point on an end of a line segment selected by the secondary searching unit and each of multiple points on an end side of a third search area, and selects a line segment having a larger evaluation value than that of the other line segments included in the second search area or the third search area; and
   a railroad track recognizing unit which recognizes a railroad track by aligning a plurality of reference points of the line segments selected by the initial searching unit and the secondary searching unit,
   wherein each of the reference points is an end point of line segment selected by the initial searching unit or an end point of the line segment selected by the secondary searching unit.

2. The railroad track recognition apparatus according to claim 1, wherein
   each of the second search area and the third search area are a triangle-shaped area formed by a first virtual line, a second virtual line and a third virtual line,
   the first virtual line and the second virtual line are extended from the reference point or the previous reference point with a given angle between the first and second virtual lines, and
   the third virtual line is a line connecting two opposite ends of the first and second virtual lines.

3. The railroad track recognition apparatus according to claim 1, further comprising:
   a point searching unit which determines, each time the line segment is selected by the initial searching unit or the secondary searching unit, a characteristic point having a largest index value by searching a given area centered on the reference point of such the selected line segment, and sets the characteristic point having the largest index value as the reference point of such the selected line segment if the characteristic point having the largest index value is not the reference point of such the selected line segment,
   wherein, the railroad track recognizing unit recognizes the railroad track by aligning a plurality of the characteristic points determined by the point searching unit, by aligning at least one characteristic point determine by the point searching unit and at least one reference point, or by aligning the plurality of reference points.

4. The railroad track recognition apparatus according to claim 1, further comprising:
   a transforming unit which transforms the captured image into a bird-view image,
   wherein, the initial searching unit and the secondary searching unit select the line segment based on the bird-view image.

5. A method for recognizing a railroad track comprising:
   calculating an index value, to be used for evaluating railroad-track-likeness, for each pixel or each pixel group of a captured image captured by a capturing device on a train vehicle;
   determining a first plurality of line segments between each of multiple points on a first end side of a first search area and each of multiple points on a second end side of the first search area, calculating an evaluation value for each of the first plurality of line segments from the index values of the pixels or the index values of the pixel groups, and selecting, based on the evaluation values, a line segment having a larger evaluation value than that of the other line segments;
   determining a second plurality of line segments between a reference point on an end of the line segment selected from the first plurality of line segments and each of multiple points on an end side of a second search area, calculating an evaluation value for each of the second plurality of line segments from the index values of the pixels or the index values of the pixel groups, and selecting, based on the evaluation values, a line segment having a larger index value than that of the other line segments included in the second search area;
   determining a third plurality of line segments between a reference point on an end of the line segment selected from the second plurality of line segments and each of multiple points on an end side of a third search area, calculating an evaluation value for each of the third plurality of line segments from the index values of the pixels or the index values of the pixel groups, and selecting, based on the evaluation values, a line segment having a larger evaluation value than that of the other line segments included in the third search area; and
   recognizing a railroad track based on the reference points of the selected line segments.

6. The method according to claim 5, wherein the determining of the third plurality of line segments further includes determining a new third plurality of line segments between the reference point on the end of the line segment selected from the third plurality of line segments and each of multiple points on an end side of a new third search area.

7. A non-transitory computer program product storing software instructions which, when implemented by a piece of computer device, carry out the method according to claim 5.

* * * * *